(12) United States Patent
Peczalski et al.

(10) Patent No.: US 10,371,550 B2
(45) Date of Patent: Aug. 6, 2019

(54) COMPACT MAGNETIC FIELD GENERATOR FOR MAGMETER

(71) Applicant: Ademco Inc., Golden Valley, MN (US)

(72) Inventors: Andy M. Peczalski, Edina, MN (US); Jong Park, Plymouth, MN (US)

(73) Assignee: Ademco Inc., Golden Valley, MN (US)

( * ) Notice: Subject to any disclaimer, the term of this patent is extended or adjusted under 35 U.S.C. 154(b) by 122 days.

(21) Appl. No.: 15/332,545

(22) Filed: Oct. 24, 2016

(65) Prior Publication Data

US 2018/0113012 A1 Apr. 26, 2018

(51) Int. Cl.
*G01F 1/58* (2006.01)
*G01F 15/18* (2006.01)

(52) U.S. Cl.
CPC .............. *G01F 1/586* (2013.01); *G01F 1/584* (2013.01); *G01F 15/185* (2013.01)

(58) Field of Classification Search
CPC ....................................................... G01F 1/588
See application file for complete search history.

(56) References Cited

U.S. PATENT DOCUMENTS

| | | | |
|---|---|---|---|
| 2,149,847 A | 3/1939 | Alexander | |
| 2,893,243 A | 7/1959 | Hurley | |
| 3,681,986 A * | 8/1972 | Wyatt | A61B 5/0265 73/861.12 |
| 4,186,600 A * | 2/1980 | Appel | G01F 1/588 73/861.12 |
| 4,195,515 A * | 4/1980 | Smoll | G01F 1/58 73/861.13 |
| 4,265,684 A * | 5/1981 | Boll | C21D 6/00 148/121 |
| 4,434,666 A * | 3/1984 | Hemp | G01F 1/58 73/861.12 |
| 4,641,537 A * | 2/1987 | Hansen | G01F 1/586 73/861.12 |
| 4,726,236 A * | 2/1988 | Wada | G01F 1/60 73/861.12 |
| 5,207,105 A * | 5/1993 | Fukunaga | G01F 1/58 73/861.11 |
| 5,307,688 A * | 5/1994 | Lefebvre | G01F 1/60 73/861.12 |
| 5,417,119 A * | 5/1995 | Smoll | A61M 1/3663 73/861.11 |
| 6,530,285 B1 * | 3/2003 | Feller | G01F 1/588 73/861.15 |
| 6,626,048 B1 * | 9/2003 | Dam Es | G01F 1/584 73/861.13 |

(Continued)

FOREIGN PATENT DOCUMENTS

RU 2502053 C2 12/2013

*Primary Examiner* — Harshad R Patel
(74) *Attorney, Agent, or Firm* — Shumaker & Sieffert, P.A.

(57) ABSTRACT

A device includes a magnetic core adapted to couple to a tube through which an ionic fluid flows, the core coupled at two ends of the core to opposite sides of the tube. A set of windings is coupled to generate a magnetic field in the core such that the ionic fluid in the tube is subjected to a magnetic field between the two ends of the core coupled to the opposite sides of the tube. A set of electrodes is positioned to detect an electric field generated as a function of the ionic fluid flow and magnetic field in the tube.

18 Claims, 6 Drawing Sheets

(56) References Cited

U.S. PATENT DOCUMENTS

| | | | | |
|---|---|---|---|---|
| 6,983,661 B2* | 1/2006 | Zingg | .................... | G01F 1/586 |
| | | | | 73/861.12 |
| 7,073,393 B2* | 7/2006 | Webb | ........................ | G01F 1/58 |
| | | | | 73/861.12 |
| 7,137,307 B2* | 11/2006 | Huybrechts | ............. | G01F 1/588 |
| | | | | 73/861.12 |
| 7,293,469 B2 | 11/2007 | Yasumatsu | | |
| 7,317,371 B1* | 1/2008 | Carroll | ................. | G01D 5/2291 |
| | | | | 336/130 |
| 7,963,173 B2* | 6/2011 | Foss | .......................... | G01F 1/58 |
| | | | | 73/861.12 |
| 7,992,451 B2* | 8/2011 | Ehrenberg | .............. | G01F 1/586 |
| | | | | 73/861.12 |
| 8,826,743 B2* | 9/2014 | Goegge | ................... | G01F 1/588 |
| | | | | 73/861.12 |
| 8,991,264 B2* | 3/2015 | Rogers | .................... | G01F 1/588 |
| | | | | 73/861.12 |
| 9,021,890 B2* | 5/2015 | Rogers | .................... | G01F 1/584 |
| | | | | 73/861.12 |
| 9,097,566 B2* | 8/2015 | Rogers | ...................... | G01F 1/58 |
| 2005/0193833 A1* | 9/2005 | Huybrechts | ............. | G01F 1/588 |
| | | | | 73/861.12 |
| 2008/0022781 A1* | 1/2008 | Huybrechts | ............... | G01F 1/58 |
| | | | | 73/861.12 |
| 2010/0024569 A1* | 2/2010 | Ehrenberg | .............. | G01F 1/586 |
| | | | | 73/861.12 |
| 2012/0037729 A1 | 2/2012 | Lee | | |
| 2015/0082908 A1* | 3/2015 | Rogers | ..................... | G01F 1/58 |
| | | | | 73/861.12 |
| 2015/0268075 A1* | 9/2015 | Rovner | .................... | G01F 1/60 |
| | | | | 73/861.12 |

* cited by examiner

COMPACT MAGNETIC FIELD GENERATOR FOR MAGMETER

BACKGROUND

According to Faraday's Law, an electrical conductor moving through a magnetic field produces an electric field within the conductor. In the case of magmeters, liquid flowing through a tube is the conductor, and electromagnetic coils surrounding the tube generate the magnetic field. Two electrodes embedded on opposite sides of the tube pick up the signal. The signal is directly proportional to the flow velocity, the intensity of the magnetic field, and the distance between the electrodes.

SUMMARY

A device includes a magnetic core adapted to couple to a tube through which an ionic fluid flows, the core coupled at two ends of the core to opposite sides of the tube. A set of windings is coupled to generate a magnetic field in the core such that the ionic fluid in the tube is subjected to a magnetic field between the two ends of the core coupled to the opposite sides of the tube. A set of electrodes is positioned to detect an electric field generated as a function of the ionic fluid flow and magnetic field in the tube.

An alternative device includes a shaped magnetic core adapted to couple to a tube through which an ionic liquid flows, the core coupled at two ends of the core to opposite sides of the tube. A set of windings is coupled to generate a magnetic field in the core such that the ionic liquid in the tube is subjected to a magnetic field between the two ends of the core coupled to the opposite sides of the tube, wherein the windings are separated from the tube. A set of electrodes is positioned to detect an electric field generated as a function of the ionic fluid flow and magnetic field in the tube. A volt meter is coupled to the set of electrodes to provide a signal representative of the electric field that is proportional to a velocity of the liquid in the tube. A driver is coupled to the set of windings to provide current to the windings to generate the magnetic field in the core. A controller is coupled to the volt meter and the driver and configured to transmit a signal representative of the velocity of the liquid in the tube.

A method includes driving current through windings on a "C" shaped magnetic core, wherein the core has a gap between two ends of the core, which ends are conformed to a tube within the gap, generating a magnetic field within the tube between the ends of the core, and measuring an electric potential across a resulting electric field in the tube, wherein the electric potential is representative of ionic fluid flow velocity within the tube.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer executable instructions stored on computer readable media or computer readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Magmeters (magnetic flowmeters) are often used to measure velocity of ionic fluids such as liquids through a pipe. Sensing of the fluid velocity is typically done with a strong magnetic field e.g. 100-200 Oe in the pipe. The embodiments described may facilitate generation strong magnetic field beyond 1000 Oe and therefore may improve sensitivity of the magmeter by up to a factor of 10 or more.

Generation of the field in the pipe can be difficult since the diameter of the pipe may be comparatively large e.g. 1-6 inch. At the same time the magnetic field generator should be inexpensive to make including materials and assembly. The present embodiments may be configured for various diameter pipes to provide such a magnetic field in a cost effective manner.

A low cost magmeter utilizes a shaped magnetic core with a coil to generate a magnetic field inside of a tube through which an ionic fluid is flowing. The core may be shaped as a "C", with ends of the shape forming an opening which may be fitted over the tube. The coils may be disposed on a portion of the core that is separated from the tube, as opposed to a conventional magmeter where two coils are placed on opposite sides of a pipe. Magnetic flux generated by the coil that is separated from the tube is guided by the core to opposite sides of the tube. Placing the coil on a shaped core with an opening allows for ease of winding the coil by simple rotating the core or wire with the wire passing through the opening as it is wound around the core.

In further embodiments, other core shapes may be used, such as a horseshoe type of shape with ends of the horseshoe bent to contact the tube, or still other shapes that facilitate coupling of the core directly to the tube to minimize flux leakage and to provide a suitable distance of the coils from the tube.

Figure 1:
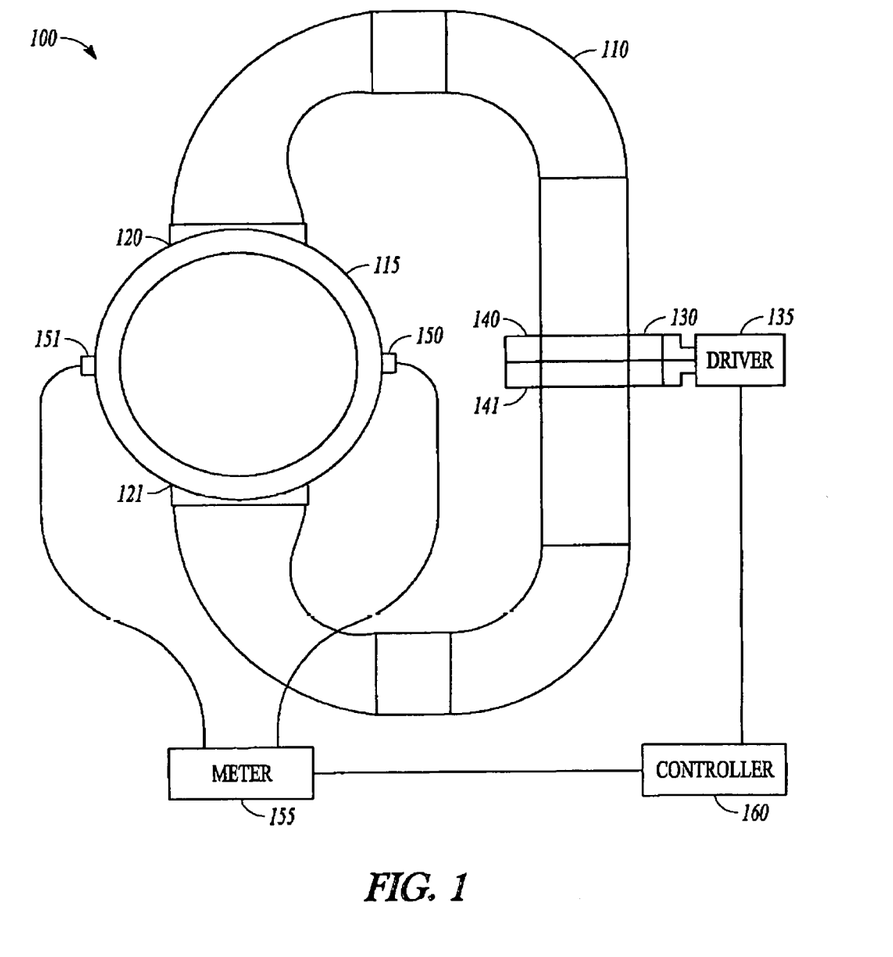
FIG. 1 is a block diagram representation of a magmeter with a shaped core according to an example embodiment.

FIG. 1 is a block diagram representation of a magmeter shown generally at 100. Magmeter 100 in one embodiment includes a magnetic core 110 adapted to couple to a tube 115 through which an ionic fluid flows, the core 110 is coupled at two ends of the core 120, 121 to opposite sides of the tube 115. In one embodiment, the magnetic core 110 has a generally "C" shape with an opening or gap between the ends 120, 121 that may be shaped to fit over the tube 115. The core may be formed of magnetic steel, such as ferromagnetic carbon steel, stainless steel, or other magnetic material suitable for directing magnetic flux, and may be cast as a single part.

The tube 115 is formed of a non-magnetic material, such as plastic, and may be formed with ends that may be adapted to couple to a pipe. The use of the core reduces magnetic flux leakage, which may be further reduced by conforming the ends 120, 121 to the contour of an outer circumference or perimeter of the tube.

In some embodiments, the tube 115 may be a pipe, and the core 110 may be inserted or slid onto the pipe or tube and secured in place, firmly positioned, or imobilized with one or more stops, such as screws or other structures, such as bumps which may be welded to the tube, or the tube may be cast with such stops. Firmly positioning the core on the tube helps ensure the relative positions of the tube and core do not change, ensuring a consistent magnetic field through the tube. Such immobilizing prevents displacement of a core end with respect to the tube which would change the magnetic field within the ionic liquid and change the calibration and therefore decrease the sensor accuracy. The term "tube" is intended to represent both a tube which may be coupled to a pipe, and the pipe itself if the core is attached directly to a pipe.

A set of windings 130 may be coupled to the core 110 to generate a magnetic field in the core 110 such that the ionic fluid in the tube 115 is subjected to a magnetic field between the two ends 120, 121 of the core coupled to the opposite sides of the tube 115. The windings 130, also referred to as coil or coils may be positioned on a portion of the shaped core 110 that is separated from the tube 115. The windings may be wound on the core efficiently by passing wire forming the windings through the opening between ends 120, 121. The windings 130 may comprise a coil of 800 turns for example.

In one embodiment, the windings 130 are coupled to the core at a position on the core 110 having a first diameter less than a diameter of the tube 115 and wherein the ends of the magnetic core 120, 121 are flared outward to contact larger portions of the outer circumference of the tube 115. In one embodiment, a cross section of the core may be fairly uniform between the flared ends. In further embodiments, the cross section of the core may vary, such as increasing in cross section in certain portions to better contain generated magnetic flux without saturating the core.

A driver 135 may be electrically coupled to provide current to the windings 130, such as 500 mA for a coil having 800 turns, to create an average magnetic field in the tube of 100 Oe. The number of turns and current may be varied for different sized tubes and different desired magnetic field strengths.

In one embodiment, the windings 130 may be formed as two oppositely wound coils 140, 141, and the driver 135 may be coupled via a twisted pair cable that significantly reduces electromagnetic field generation that may upset other circuitry. The use of oppositely wound coils 140, 141 allows the use of complementary currents, which may further reduce electromagnetic field generation as well as allow the use of simplified circuitry to generate the magnetic flux in the core. The oppositely wound coils 140, 141 may also be placed close together as shown to further reduce electromagnetic field generation. Further, since the core 110 focusses magnetic flux directly to the tube 115, fewer windings may be used to generate the same flux obtainable by the conventional use of coils positioned directly on the pipe.

In one embodiment, a set of electrodes 150, 151 are positioned to detect an electric field generated as a function of the ionic fluid flow perpendicular to the magnetic field in the tube 115. The electrodes 150, 151 may be electrically insulated from the tube and in electrical contact with the liquid. The electrodes 150, 151 may be coupled to a high impedance voltage meter 155 in one embodiment to measure the difference in potential between the electrodes. The electrodes in one embodiment may be constructed using very low cost rectangular plates made of metal, for example, like stainless steel that is imbedded in the tube such as during tube manufacturing.

The meter 155 may be coupled to a controller 160 to receive signals representative of the potential from the voltmeter. Controller 160 may also be coupled to the driver 135 to control current provided by the driver and coordinate the driver 135 and meter 155 operation. The controller may be further coupled via wired or wireless connection to transmit measurements to other devices, such as a central controller where the magmeter may be part of a process control system. Such a magmeter may also be referred to as a transmitter.

The core 110 and other components of the magmeter 100 may be adapted to fit tubes or pipes of various diameters. More turns on windings 130 may be used for larger diameter pipes. The relationship between windings and pipe diameter may not be directly proportional, as electrode spacing is also increased with larger diameter pipes, resulting in a larger electric field distance.

Figure 2:
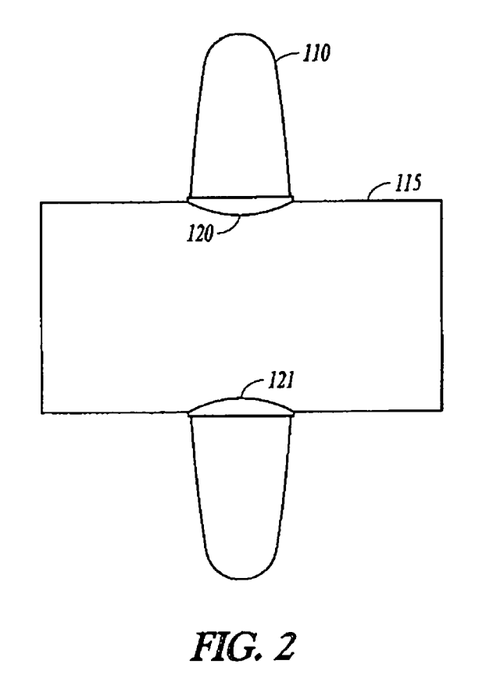
FIG. 2 is a side elevation block diagram view of the magmeter of FIG. 1 according to an example embodiment.

In one embodiment, the tube is round in cross section as illustrated in FIG. 1 and a side view representation in FIG. 2 wherein the references numbers are the same as in FIG. 1.

Figure 3:
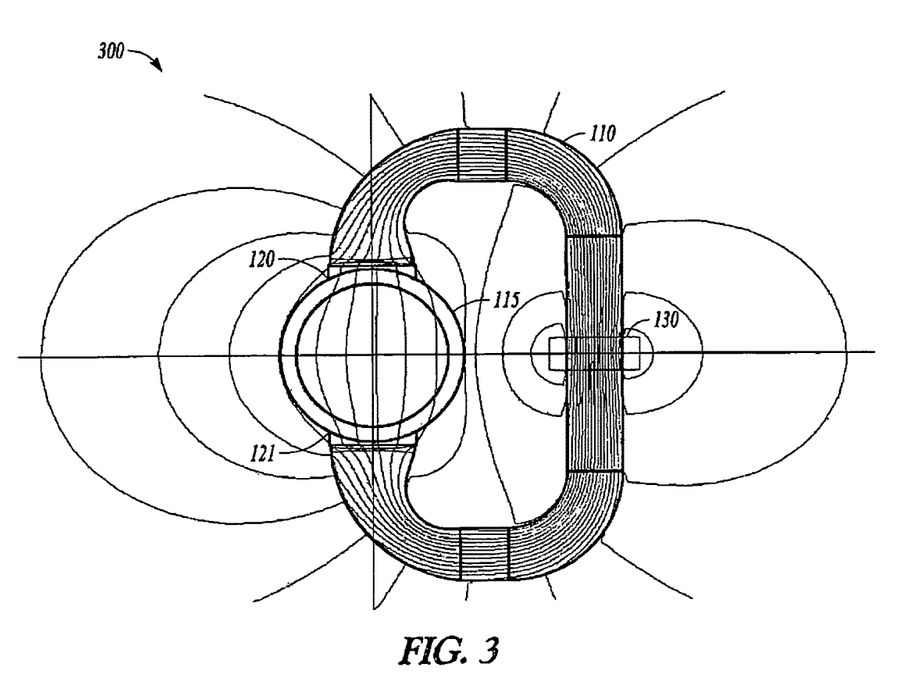
FIG. 3 is a diagram of the magmeter of FIG. 1 showing flux lines representative of flux density according to an example embodiment.

FIG. 3 is a block diagram showing the same view of the magmeter 100 at 300 with flux lines added to represent magnetic flux density. The flux lines are closest together in the core 110 surrounded by the windings 130. Some flux lines result from the windings 130 outside of the core 110, but the majority of magnetic flux generated by the coils is constrained and guided by the core 110, with minimal flux leakage along the core 110. The ends 120, 121 of the core 110 direct the majority of the remaining lines of flux through the pipe, with some loss indicated by lines of flux outside the pipe.

Figure 4:
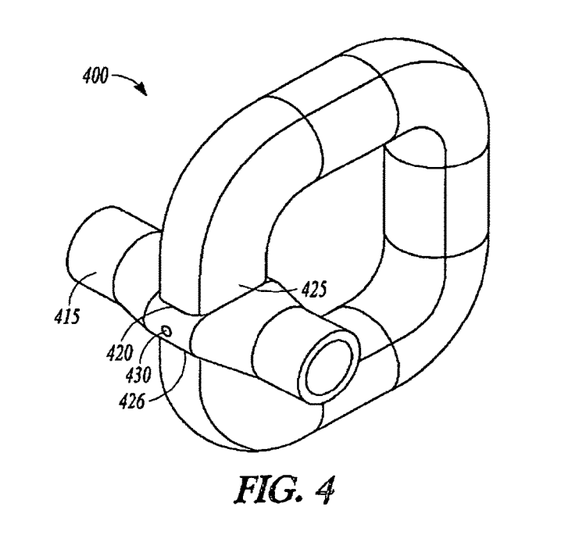
FIG. 4 is a block diagram of a magmeter with a flattened tube according to an example embodiment.

FIG. 4 is a perspective view of an alternative magmeter 400. Magmeter 400 includes a shaped core 410 and a tube 415 which has a partially flattened portion 420. Ends 425, 426 of the core are conformed to opposite sides of the flattened portion 420. Electrodes 430 (one visible) may be positioned across from each other in the flattened portion 420. Tube 415 may transition to round cross sections on both ends of the flattened portion 420 for ease of coupling to a pipe carrying ionic liquid. The flattened portion 420 and conforming ends 425, 426 of the core 410 may further reduce flux leakage about the tube 415 and also may serve to create a larger distance between electrodes and create a commensurate larger difference in potential between the electrodes, providing either a more sensitive magmeter, or allow a further reduction in the number of windings of coils. Note that FIG. 4 is a simplified block perspective view and does not illustrate the coils, meter, driver, and controller for ease of illustration.

In various embodiments, once the magmeter is assembled, a single calibration may be performed and sufficient to operate the magmeter. Such calibrations may be conventional and are useful as manufacturing tolerances may result in significant differences in magnetic field generation and electric field detection.

However, if the mechanical design prevents movement of the core versus the tube and the magnetic field generated in the tube is not dependent strongly on the inevitable changes of magnetic properties of the core material (the typical changes due to the metal bending or cutting or just process of forging may result in changes of the saturated field by 20% or permeability by factor of two) calibration of a single magmeter could be representative of all magmeters in the batch and reduce the cost of calibration. One example of such robust design uses high carbon steel with high permeability. Another example of a robust design is to keep the magnetic flux on the core from coming close to the saturation.

Figure 5:
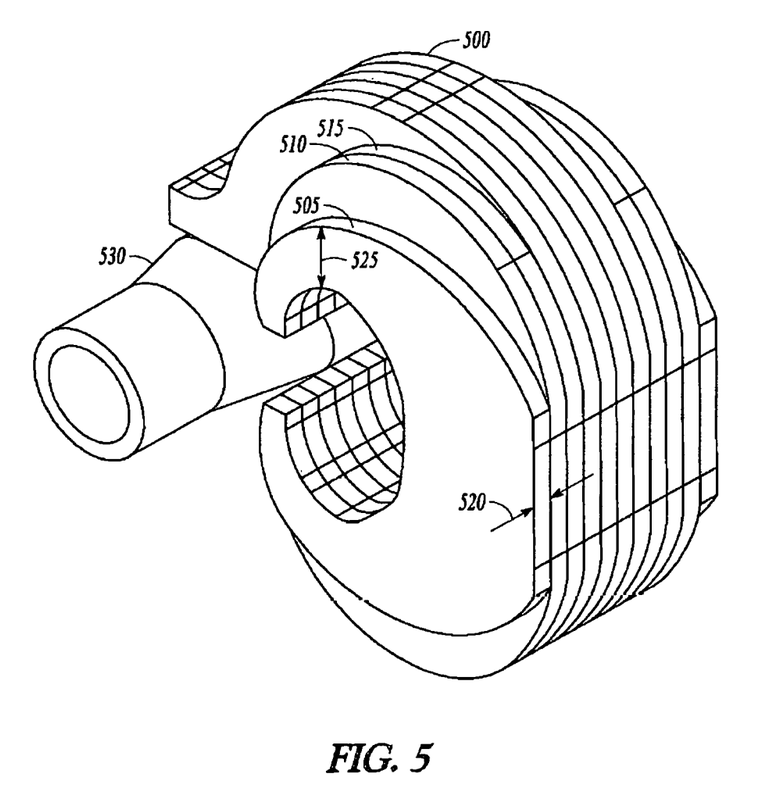
FIG. 5 is a perspective view of a magnetic core having a variable cross section to further contain magnetic flux according to an example embodiment.

Keeping the magnetic flux low enough to avoid coming close to saturation at any point in the core aids in designing for calibration free manufacturing. In one embodiment, the core cross section may be varied to make the core larger in areas to contain the magnetic flux and avoid saturation. The varied cross section may be provide by layering the core to increase magnetic field in the fluid and therefore sensitivity FIG. 5 is a perspective view of a magnetic core 500 having multiple additional layers 505, 510, and 515 of metal added to a uniform thickness core in portions of the core 500 where the magnetic flux is high. The additional layers may reduce the magnetic flux loss. The additional layers may allow for increasing the number of windings and/or current and therefore the magnetic field in the ionic fluid up to 1600 Gauss. This will increase the sensitivity of the magmeter.

In one embodiment, the core has a layered structure to increase core cross-section in places where the high magnetic flux occurs. While three additional layers are shown covering a gradually reduced area laterally from a center of the core, more or fewer layers may be added of varying thickness 520. The additional layers about the windings may have a uniform width consistent with a width of the center core in one embodiment. The width 525 of the additional layers may varyingly gradually taper towards the flattened tube indicated at 530 and may also contact the tube 530 as does the center core. Thus, the number of additional layers, the thickness of each additional layer, and the width of each additional layer may be tailored to minimize loss of magnetic flux from the core. In further embodiments, similar core cross section profiles may be obtained by forming a single piece core such as by casting or sculpting.

Figure 6:
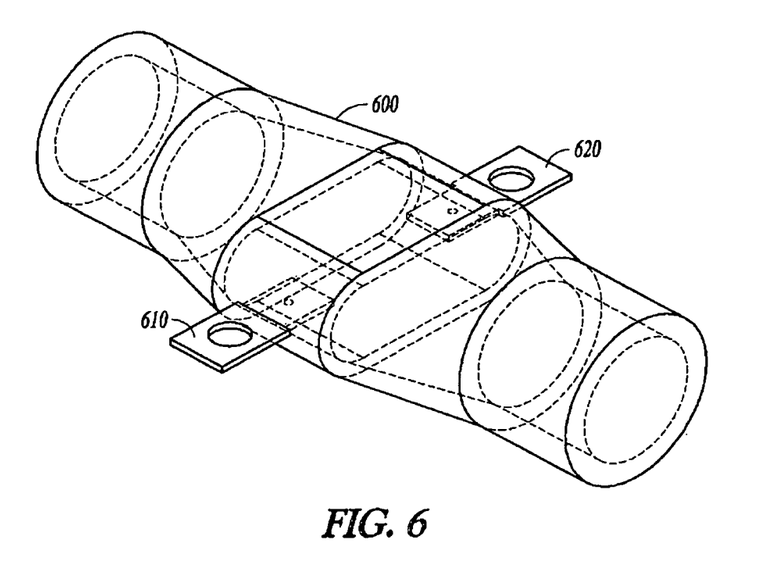
FIG. 6 is a perspective frame view of a tube showing a pair of electrodes positioned transverse to the direction of fluid flow through tube and the magnetic flux according to an example embodiment.

FIG. 6 is a perspective frame view of a tube 600 showing a pair of electrodes 610 and 620 positioned transverse to the direction of fluid flow through tube 600 and the magnetic flux created by a magentic core, not shown. In one embodiment, the electrodes may be in the form of embedded metal tabs and constructed using very low cost rectangular plates made of metal, for example, like stainless steel that is imbedded in the plastic during plastic tube manufacturing.

Figure 7:
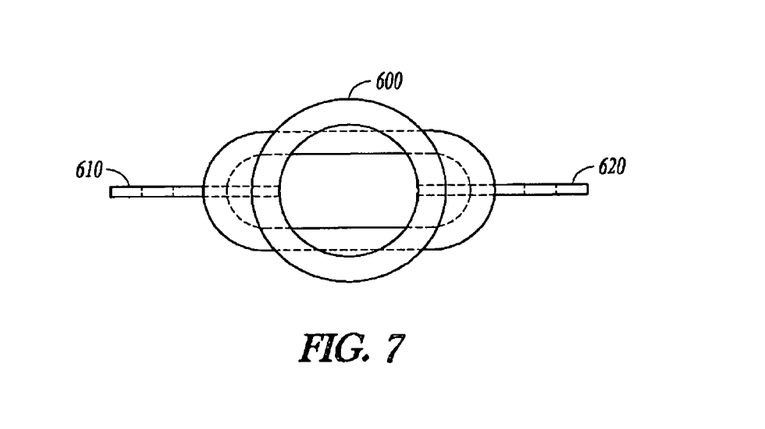
FIG. 7 is an end view of the tube of FIG. 6.
Figure 8:
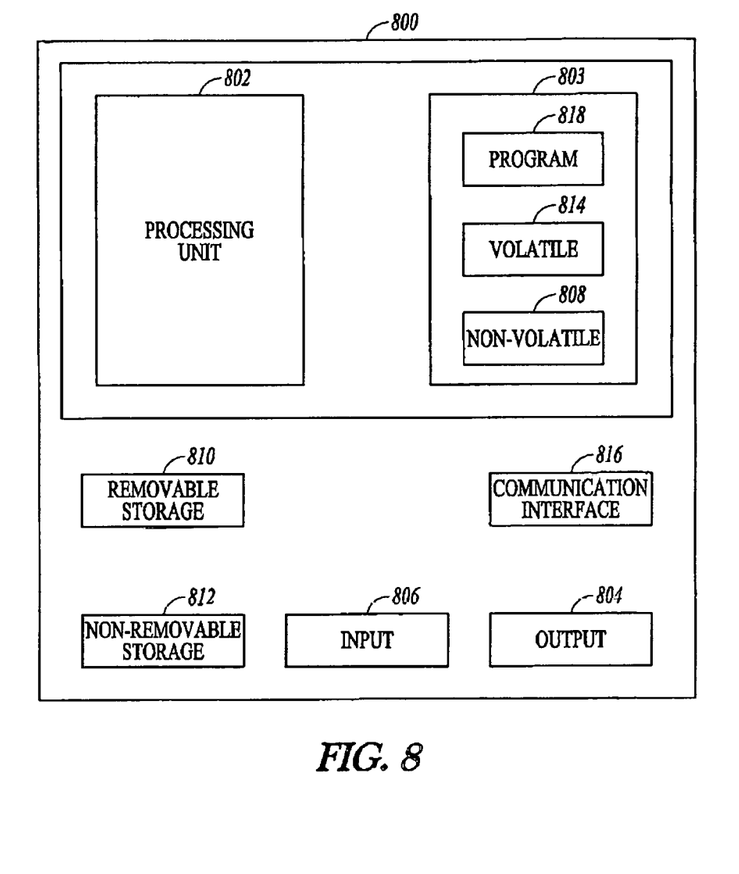
FIG. 8 is a block schematic diagram of a computer system to implement a controller of the magmeter of FIG. 1 and implement methods according to example embodiments.

FIG. 7 is an end view showing the tube 600 and electrodes 610 and 620. Note that the end view illustrates that the electrodes are positioned through the tube to contact fluid within the tube. In one embodiment, the ends of the tube are round, and the middle of the tube is flattened. The middle of the tube contains the embedded electrodes which extend into the flattened portion of the tube an amount substantially coinciding with an inner diameter of the round ends of the tube such that fluid flow is not significantly disturbed, yet good electrical contact is made with the fluid.

FIG. 7 is a block schematic diagram of a computer system 700 to implement controller 160 to perform methods according to example embodiments. All components need not be used in various embodiments. One example computing device in the form of a computer 700, may include a processing unit 702, memory 703, removable storage 710, and non-removable storage 712. Although the example computing device is illustrated and described as computer 700, the computing device may be in different forms in different embodiments. For example, the computing device may instead be a smartphone, a tablet, smartwatch, or other computing device including the same or similar elements as illustrated and described with regard to FIG. 7. Devices such as smartphones, tablets, and smartwatches are generally collectively referred to as mobile devices. Further, although the various data storage elements are illustrated as part of the computer 700, the storage may also or alternatively include cloud-based storage accessible via a network, such as the Internet.

Memory 803 may include volatile memory 814 and non-volatile memory 808. Computer 800 may include—or have access to a computing environment that includes—a variety of computer-readable media, such as volatile memory 814 and non-volatile memory 808, removable storage 810 and non-removable storage 812. Computer storage includes random access memory (RAM), read only memory (ROM), erasable programmable read-only memory (EPROM) & electrically erasable programmable read-only memory (EEPROM), flash memory or other memory technologies, compact disc read-only memory (CD ROM), Digital Versatile Disks (DVD) or other optical disk storage, magnetic cassettes, magnetic tape, magnetic disk storage or other magnetic storage devices capable of storing computer-readable instructions for execution to perform functions described herein.

Computer 800 may include or have access to a computing environment that includes input 806, output 804, and a communication connection 816. Output 804 may include a display device, such as a touchscreen, that also may serve as an input device. The input 806 may include one or more of a touchscreen, touchpad, mouse, keyboard, camera, one or more device-specific buttons, one or more sensors integrated within or coupled via wired or wireless data connections to the computer 800, and other input devices. The computer may operate in a networked environment using a communication connection to connect to one or more remote computers, such as database servers, including cloud based servers and storage. The remote computer may include a personal computer (PC), server, router, network PC, a peer device or other common network node, or the like. The communication connection may include a Local Area Network (LAN), a Wide Area Network (WAN), cellular, WiFi, Bluetooth, or other networks.

Computer-readable instructions stored on a computer-readable storage device are executable by the processing unit 802 of the computer 800. A hard drive, CD-ROM, and RAM are some examples of articles including a non-transitory computer-readable medium such as a storage device. The terms computer-readable medium and storage device do not include carrier waves. For example, a computer program 818 may be used to cause processing unit 802 to perform one or more methods or algorithms described herein.

EXAMPLES

1. In example 1, a device includes a magnetic core adapted to couple to a tube through which an ionic fluid flows, the core coupled at two ends of the core to opposite sides of the tube. A set of windings is coupled to generate a magnetic field in the core such that the ionic fluid in the tube is subjected to a magnetic field between the two ends of the core coupled to the opposite sides of the tube. A set of electrodes is positioned to detect an electric field generated as a function of the ionic fluid flow and magnetic field in the tube.

2. The device of example 1 wherein the ends of the magnetic core are shaped to conform to portions of an outer circumference of the tube.

3. The device of example 2 wherein the windings are coupled to the core having a first diameter less than a diameter of the tube and wherein the ends of the magnetic core are flared outward to contact larger portions of the outer circumference of the tube.

4. The device of any of examples 1-3 where the core has layered structure to increase cross-section in places where the high magnetic flux occurs.

5. The device of any of examples 1-4 wherein the tube is partially flattened and wherein the ends of the core coupled to opposite sides of the tube are shaped to conform to the partially flattened tube.

6. The device of any of examples 1-5 wherein the set of windings comprises two opposite wound halves.

7. The device of example 6 and further comprising a driver circuit coupled to drive the two opposite wound halves with complementary electric currents.

8. The device of example 7 wherein the driver circuit is coupled to the opposite wound halves by a twisted pair cable to reduce electromagnetic field generation.

9. The device of any of examples 1-8 wherein the core is formed in the shape of a "C" and is formed of ferromagnetic carbon steel having a cross section that is varied to miminize loss of magnetic flux from the core.

10. The device of any of examples 1-9 wherein the tube is formed of plastic and the electrodes made of plates embedded in the plastic of the tube.

11. The device of any of examples 1-10 wherein an inner portion of the tube about a portion of the tube wherein ionic fluid in the tube is subjected to a magnetic field and wherein the electrodes are positioned to contact the ionic fluid.

12. The device of any of examples 1-11 and further including a driver coupled to provide current to the windings for generation of the magnetic field in the core, a high impedance voltage meter coupled to the electrodes, and a controller coupled to the driver and the high impedance voltage meter.

13. In example 13, a device includes a shaped magnetic core adapted to couple to a tube through which an ionic liquid flows, the core coupled at two ends of the core to opposite sides of the tube. A set of windings is coupled to generate a magnetic field in the core such that the ionic liquid in the tube is subjected to a magnetic field between the two ends of the core coupled to the opposite sides of the tube, wherein the windings are separated from the tube. A set of electrodes is positioned to detect an electric field generated as a function of the ionic fluid flow and magnetic field in the tube. A volt meter is coupled to the set of electrodes to provide a signal representative of the electric field that is proportional to a velocity of the liquid in the tube. A driver is coupled to the set of windings to provide current to the windings to generate the magnetic field in the core. A controller is coupled to the volt meter and the driver and configured to transmit a signal representative of the velocity of the liquid in the tube.

14. The device of example 13 wherein the ends of the magnetic core are shaped to conform to portions of an outer circumference of the tube comprising a pipe.

15. The device of example 14 wherein the windings are coupled to the core having a first diameter less than a diameter of the tube and wherein the ends of the magnetic core are flared outward to contact larger portions of the outer circumference of the tube.

16. The device of any of examples 13-15 wherein the core has a cross section that is varied to minimize loss of magnetic flux.

17. The device of any of examples 13-16 wherein the tube is partially flattened and wherein the ends of the core coupled to opposite sides of the tube are shaped to conform to the partially flattened tube.

18. The device of any of examples 13-17 wherein the set of windings comprises two opposite wound halves and wherein the driver current comprises complementary electric currents provided to the windings via a twisted pair cable.

19. The device of any of examples 13-18 wherein an inner portion of the tube about a portion of the tube wherein ionic liquid in the tube is subjected to a magnetic field and wherein the electrodes are insulated from the tube and positioned to contact the ionic liquid, and wherein the shaped magnetic core has a "C" shape with varying cross section and a gap configured to mate with the tube, and wherein the windings are positioned on the C shape opposite the gap to create the separation between the windings and the tube, and wherein the varying cross section of the magnetic core and mating of the core and tube provide a consistent magnetic field within the tube such that calibration of one device is useable for all devices in a same manufacturing batch.

20. In example 20, a method includes driving current through windings on a "C" shaped magnetic core, wherein the core has a gap between two ends of the core, which ends are conformed to a tube within the gap, generating a magnetic field within the tube between the ends of the core, and measuring an electric potential across a resulting electric field in the tube, wherein the electric potential is representative of ionic fluid flow velocity within the tube. Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

The invention claimed is:
1. A device for measuring flow, the device comprising:
 a magnetic core for coupling to an outer circumference of a tube through which an ionic fluid flows, the magnetic core coupled at two ends of the magnetic core to opposite sides of the tube;

a set of windings adapted to generate a magnetic field in the magnetic core such that the ionic fluid in the tube is subjected to the magnetic field between the two ends of the magnetic core coupled to the opposite sides of the tube, wherein the set of windings are coupled to the magnetic core at a position of the magnetic core having a first diameter and wherein the two ends of the magnetic core are flared outward to have a second diameter greater than the first diameter to contact larger portions of the outer circumference of the tube; and a set of electrodes positioned on the tube and transverse to the magnetic field to detect an electric field generated as a function of the ionic fluid flow and magnetic field in the tube.

2. The device of claim 1, wherein the two ends of the magnetic core are shaped to conform to portions of the outer circumference of the tube.

3. The device of claim 1, wherein the magnetic core has a layered structure to increase cross-section in places where the high magnetic flux occurs.

4. The device of claim 1, wherein the tube is partially flattened and wherein the two ends of the magnetic core coupled to opposite sides of the tube are shaped to conform to the tube.

5. The device of claim 1, wherein the set of windings comprises two opposite wound halves.

6. The device of claim 5, further comprising a driver circuit coupled to drive the two opposite wound halves with complementary electric currents.

7. The device of claim 6, wherein the driver circuit is coupled to the opposite wound halves by a twisted pair cable to reduce electromagnetic field generation.

8. The device of claim 1, wherein the magnetic core is formed in the shape of a "C" and is formed of ferromagnetic carbon steel having a cross section that is varied to minimize loss of magnetic flux from the core.

9. The device of claim 1, wherein the tube is formed of plastic and the set of electrodes are made of plates embedded in the plastic of the tube.

10. The device of claim 1, wherein the set of electrodes are positioned to contact the ionic fluid at an inner portion of the tube at a portion of the tube where ionic fluid in the tube is subjected to the magnetic field.

11. The device of claim 1, further comprising:
a driver coupled to provide current to the set of windings for generation of the magnetic field in the magnetic core;
a high impedance voltage meter coupled to the set of electrodes; and
a controller coupled to the driver and the high impedance voltage meter.

12. A device for measuring flow, the device comprising:
a shaped magnetic core for coupling to an outer circumference of a tube through which an ionic liquid flows, the shaped magnetic core coupled at two ends of the shaped magnetic core to opposite sides of the tube;
a set of windings coupled to generate a magnetic field in the shaped magnetic core such that the ionic liquid in the tube is subjected to the magnetic field between the two ends of the shaped magnetic core coupled to the opposite sides of the tube, wherein the set of windings are separated from the tube, and wherein the set of windings are coupled to the shaped magnetic core at a position of the shaped magnetic core having a first diameter and wherein the two ends of the shaped magnetic core are flared outward to have a second diameter greater than the first diameter to contact larger portions of the outer circumference of the tube;
a set of electrodes positioned on the tube and transverse to the magnetic field to detect an electric field generated as a function of the ionic fluid flow and the magnetic field in the tube;
a volt meter coupled to the set of electrodes to provide a signal representative of the electric field that is proportional to a velocity of the ionic liquid in the tube;
a driver coupled to the set of windings to provide current to the set of windings to generate the magnetic field in the shaped magnetic core; and
a controller coupled to the volt meter and the driver and configured to transmit a signal representative of the velocity of the ionic liquid in the tube.

13. The device of claim 12, wherein the two ends of the shaped magnetic core are shaped to conform to portions of the outer circumference of the tube comprising a pipe.

14. The device of claim 12, wherein the shaped magnetic core has a cross section that is varied to minimize loss of magnetic flux.

15. The device of claim 12, wherein the tube is partially flattened and wherein the two ends of the shaped magnetic core coupled to opposite sides of the tube are shaped to conform to the partially flattened tube.

16. The device of claim 12, wherein the set of windings comprises two opposite wound halves and wherein the driver current comprises complementary electric currents provided to the set of windings via a twisted pair cable.

17. The device of claim 12, wherein the set of electrodes are insulated from the tube and positioned to contact the ionic fluid at an inner portion of the tube about a portion of the tube where ionic liquid in the tube is subjected to the magnetic field, wherein the shaped magnetic core has a "C" shape with varying cross section and a gap configured to mate with the tube, and wherein the set of windings are positioned on the "C" shape opposite the gap to create the separation between the set of windings and the tube, and wherein the varying cross section of the shaped magnetic core and mating of the shaped magnetic core and tube provide the magnetic field to be consistent within the tube such that calibration of one device is useable for all devices in a same manufacturing batch.

18. A method comprising:
driving current through windings on a C-shaped magnetic core, wherein the C-shaped magnetic core has a gap between two ends of the C-shaped magnetic core, wherein the two ends are conformed to couple to an outer circumference of a tube within the gap, and wherein the windings are coupled to the C-shaped magnetic core at a position of the C-shaped magnetic core having a first diameter and wherein the two ends of the magnetic core are flared outward to have a second diameter greater than the first diameter to contact larger portions of the outer circumference of the tube;
generating a magnetic field within the tube between the two ends of the C-shaped magnetic core; and
measuring an electric potential across a resulting electric field in the tube, wherein the electric potential is representative of ionic fluid flow velocity within the tube.

* * * * *